(12) United States Patent
Drigani et al.

(10) Patent No.: US 6,729,625 B2
(45) Date of Patent: May 4, 2004

(54) ANNULAR SEAL FOR ROLLING ROLLS

(75) Inventors: Fausto Drigani, Zugliano-Pozzuolo Del Friuli (IT); Riccardo Melchior, Tarcento (IT); Marco Di Giacomo, Cormons (IT)

(73) Assignee: Danieli & C. Officine Meccaniche S.p.A., Buttrio (IT)

( * ) Notice: Subject to any disclaimer, the term of this patent is extended or adjusted under 35 U.S.C. 154(b) by 0 days.

(21) Appl. No.: 10/026,561

(22) Filed: Dec. 27, 2001

(65) Prior Publication Data

US 2002/0084594 A1 Jul. 4, 2002

(30) Foreign Application Priority Data

Dec. 29, 2000 (IT) ..................... UD2000A0230

(51) Int. Cl.⁷ ................................. F16J 15/32
(52) U.S. Cl. .................. 277/566; 277/569; 277/572
(58) Field of Search ..................... 277/551, 560, 277/564–6, 568, 569, 562, 402, 351–3, 559, 572

(56) References Cited

U.S. PATENT DOCUMENTS

| | | | | |
|---|---|---|---|---|
| 2,446,380 A | * | 8/1948 | Meyers et al. ............... | 277/559 |
| 3,214,182 A | * | 10/1965 | Herbruggen ................ | 277/465 |
| 3,259,442 A | * | 7/1966 | Boghosian ................. | 384/480 |
| 3,330,567 A | * | 7/1967 | Mercer et al. .............. | 277/589 |
| 3,482,845 A | * | 12/1969 | Bertrandi et al. ........... | 277/559 |
| 3,504,919 A | * | 4/1970 | Halliday et al. ............ | 277/559 |
| 3,545,774 A | * | 12/1970 | Rickley ..................... | 277/564 |
| 4,165,881 A | | 8/1979 | Salter | |
| 4,234,196 A | * | 11/1980 | Iida ........................... | 277/565 |
| 4,283,063 A | | 8/1981 | Prescott | |
| 4,311,316 A | * | 1/1982 | Cather, Jr. .................. | 277/309 |
| 4,389,053 A | * | 6/1983 | Innis et al. ................. | 277/402 |
| 4,586,720 A | | 5/1986 | Simmons et al. | |
| 4,650,196 A | * | 3/1987 | Bucher et al. .............. | 277/553 |
| 4,866,827 A | * | 9/1989 | Benfer et al. ............... | 277/351 |
| 5,129,744 A | * | 7/1992 | Otto et al. .................. | 384/486 |
| 5,163,692 A | * | 11/1992 | Schofield et al. .......... | 277/436 |
| 5,316,392 A | | 5/1994 | Innis, Jr. | |
| 5,478,090 A | * | 12/1995 | Simmons et al. .......... | 277/423 |
| 6,053,501 A | * | 4/2000 | Innis et al. ................. | 277/571 |

FOREIGN PATENT DOCUMENTS

| | | | |
|---|---|---|---|
| DE | 2246390 | | 3/1974 |
| DE | 3442463 | | 5/1986 |
| GB | 2174463 | | 11/1986 |
| JP | 2030314 | | 1/1990 |
| JP | 11-248004 | * | 9/1999 |
| JP | 2001-205314 | * | 7/2001 |

* cited by examiner

Primary Examiner—Alison K. Pickard
(74) Attorney, Agent, or Firm—Stevens, Davis, Miller & Mosher, LLP

(57) ABSTRACT

An annular seal (10) for a rolling roll (12) able to be assembled rotatable on at least one supporting oil-film bearing (15), including an annular body (20) made of flexible material, shaped to define a central cavity (21) able to be coupled with a tapered end (11) of the rolling roll (12), between the supporting bearing (15) and a front surface (16) of the rolling roll (12), and a pair of substantially parallel radial appendices (22, 23), which define an outer annular compartment (25) in which, during use, a separation element (26) of a fixed supporting flange (27) is able to be arranged; in the seal (10) at least terminal lips (29, 30) of the radial appendices (22, 23), at least on the side arranged towards the annular compartment (25), are provided with anti-wear elements (31) able to contact, during use, a sliding surface (32) of the fixed supporting flange (27).

34 Claims, 2 Drawing Sheets

ANNULAR SEAL FOR ROLLING ROLLS

FIELD OF THE INVENTION

The invention concerns a annular seal able to be positioned on each end, or neck, shaped like a truncated cone, of a rolling roll, in proximity with a corresponding supporting oil-film bearing, to guarantee that the oil arriving from the bearing is sealed and at the same time to prevent water, other cooling liquid or any impurity, from entering from outside into the zone of the oil. Once coupled with the neck of the rolling roll, the seal is able to rotate therewith and to follow the axial displacements thereof.

BACKGROUND OF THE INVENTION

Annular seals are able to be assembled on the tapered ends, with a conical surface, of the rolling rolls, each one between a corresponding supporting oil-film bearing and a front surface of the rolling roll, to rotate with the latter and to follow the axial displacements thereof, if any.

The function of annular seals is to guarantee, during use, that the oil arriving from the supporting bearing is sealed and at the same time prevent water and any impurities from entering from outside into the zone of the bearing.

The state of the art includes an annular seal for rolling rolls which comprises an annular body made of flexible material, shaped so as to define a through central cavity, able to be coupled with a tapered end of the rolling roll. Two substantially parallel radial appendices extend from the annular body and define an outer annular compartment, inside which, during use, a separation tooth of a fixed supporting flange is inserted.

The radial appendices are provided with terminal lips able to contact, during use, a sliding surface of the fixed supporting flange.

This conventional seal has the disadvantage that the terminal lips, which are normally made of elastomer, are subject to considerable wear, due to the sliding friction and to the impurities such as scale or suchlike contained in the cooling water and which mainly affect the lip on the water seal side. The friction also causes a considerable overheating of the terminal lips.

This disadvantage affects the duration of the seals, and therefore it is necessary to have them replaced frequently.

The present Applicant has devised, designed and embodied the seal according to the invention to overcome this and other shortcomings of conventional seals, and to achieve the purposes explained hereafter.

SUMMARY OF THE INVENTION

The seal according to the invention is set forth and characterized in the main claim, while the dependent claims describe other innovative features of the invention.

One purpose of the invention is to achieve a seal which is very reliable from the point of view of the static and dynamic seal, both on the oil side and on the water side, and which, at the same time, has a considerable working life, substantially without losing its initial characteristics.

Another purpose of the invention is to achieve a seal wherein the elements subject to particular wear, due to friction and impurities, are made of a material with a low friction coefficient, lower than that of the flexible material of which the annular body of the seal is made.

In accordance with these purposes, the annular seal according to the invention comprises an annular body of flexible material, shaped so as to define a central cavity able to be coupled with a tapered end of the rolling roll, between a supporting bearing and a front surface of the rolling roll, and a pair of substantially parallel radial appendices which define an outer annular compartment in which, during use, a separation element of a fixed supporting flange is able to be arranged. The terminal sealing lips of the radial appendices, at least on the side arranged towards the aforesaid annular compartment, are provided with anti-wear elements able to contact, during use, a sliding surface of the fixed supporting flange.

The anti-wear elements are advantageously made of self-lubricating material, such as PTFE with added bronze, with a very high resistance to abrasion, so as to drastically reduce the heat developed through friction due to the movements of translation, but especially of rotation, of the seal with respect to the fixed supporting flange.

Advantageously, the anti-wear elements are made in a single piece with the sealing lips and are vulcanized directly onto the material of which the annular body is made, instead of being glued after the seal has been molded.

The width of the outer compartment, defined by the two radial appendices, is such as to permit, during use, the total axial displacement of the rolling roll without the inner walls of the radial appendices, during normal functioning, coming into contact with the separation element of the fixed supporting flange.

Moreover, the position of the radial appendices, with respect to the annular body from which they extend, is such that, during use, for every axial position of the rolling roll, the sealing lips are always in contact with the sliding surface of the fixed supporting flange.

With the sole purpose of creating a further barrier to the leakage of oil from one side and the entry of water on the other, the annular body has a plurality of tiny circular ridges, having a height comprised between about 1 and 2 mm and arranged inside the through central cavity.

According to another characteristic feature of the invention, the seal also comprises a plurality of radial ribs coupled with at least one of the afore-said radial appendices to prevent the latter from being deformed by the separation element of the fixed flange during the operations to assemble or remove the seal itself.

A rigid disk, advantageously metal, is able to be coupled, during use, with the annular body of the seal. To be more exact, the disk comprises a front wall able to be arranged parallel to the front surface of the rolling roll, an inner tapered part, able to laterally contact the annular body of the seal, and an outer part, also tapered, able to facilitate, during use, the expulsion of the water due to the centrifugal force.

BRIEF DESCRIPTION OF THE DRAWINGS

These and other characteristics of the invention will be clear from the following description of a preferential form of embodiment, given as a non-restrictive example, with reference to the attached drawings wherein.

DETAILED DESCRIPTION OF PREFERRED EMBODIMENT

Figure 1:
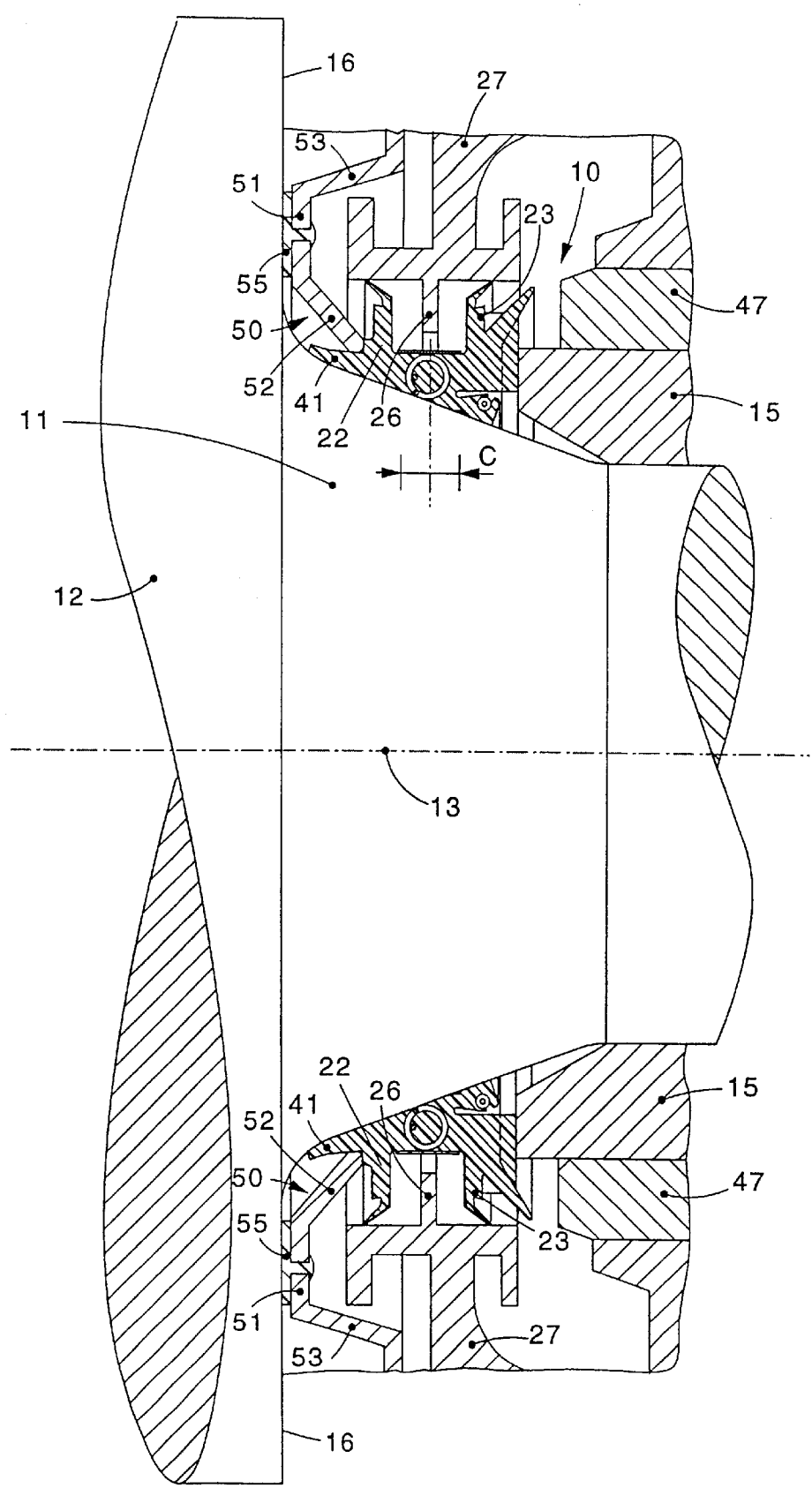
FIG. 1 is a transverse section of a annular seal according to the invention, assembled on a rolling roll.
Figure 2:
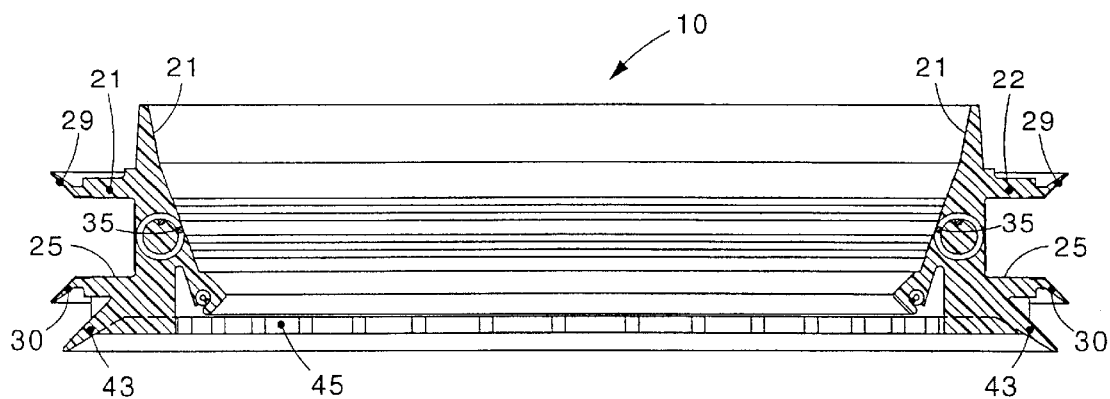
FIG. 2 is a transverse section of the seal in FIG. 1.
Figure 3:
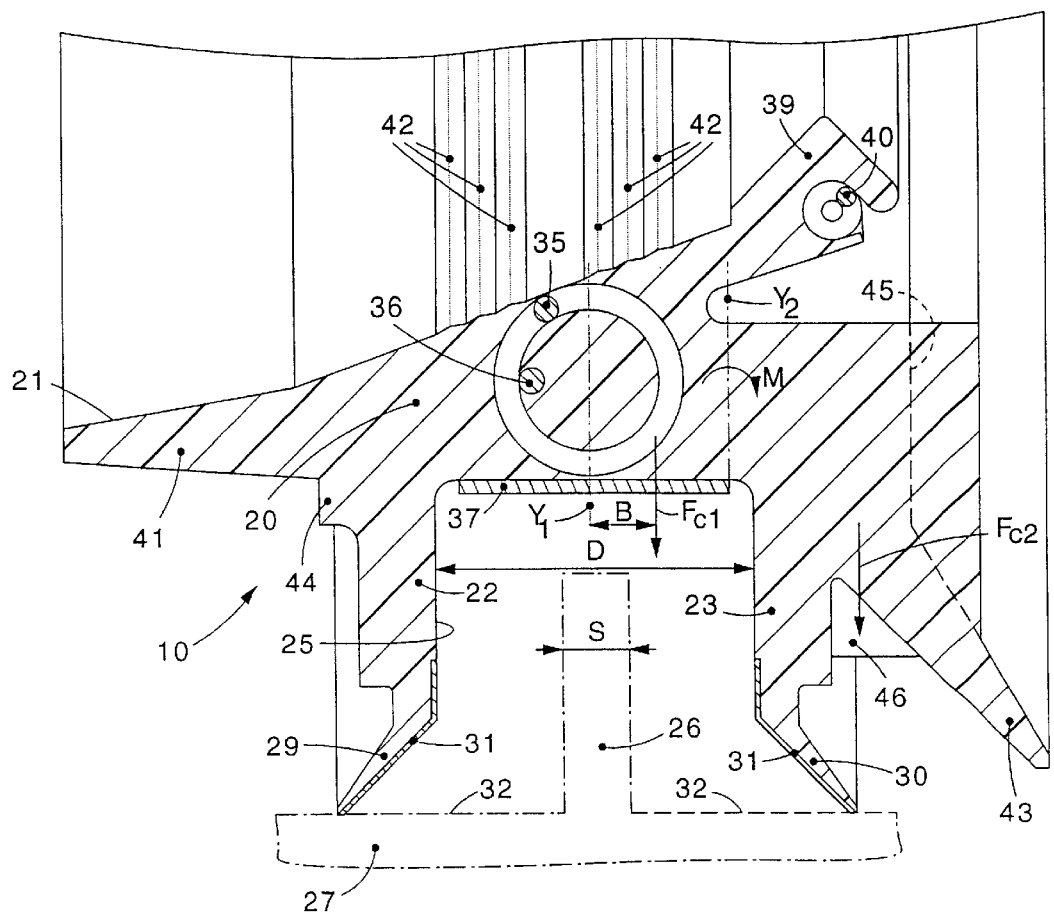
FIG. 3 is an enlarged detail of FIG. 2.

With reference to the attached drawings, a annular seal 10 according to the invention is able to be coupled with a tapered end 11, or neck, substantially shaped like a truncated cone, of a rolling roll 12 of a conventional type, for example a back-up roll of a rolling stand, which is not only able to rotate around its own axis of rotation 13, but also to move axially by a determined travel C.

The seal 10, to be more exact, is able to be arranged between a supporting oil-film bearing 15, of a conventional type, and an inner front surface 16 of the rolling roll 12.

Once it has been assembled onto the tapered end 11 of the rolling roll 12, the seal 10 is able to rotate therewith and to follow the axial displacements thereof.

The function of the seal 10 is to ensure, during use, that the oil arriving from the supporting bearing 15 is sealed, and at the same time to prevent the water and possible impurities from entering from outside into the zone of the bearing 15.

The seal 10 comprises an annular body 20 made of flexible material, for example an elastomer, which is shaped, during the molding step, so as to define a through central cavity 21, substantially shaped like a truncated cone and able to be coupled with the corresponding surface, also shaped like a truncated cone, of the tapered end 11 of the rolling roll 12.

Two radial appendices 22 and 23, or sealing flanges, extend outwards from the annular body 20; they are substantially parallel and define an outer annular compartment 25 inside which a separation element, or tooth, 26, of a fixed supporting flange 27 is positioned during use. The radial appendices 22 and 23 terminally define two corresponding sealing lips 29 and 30, which constitute the most delicate part of the seal 10, as they are able to perform the function of dynamic sealing with respect to the fixed supporting flange 27.

According to a characteristic feature of the invention, each sealing lip 29 and 30 is provided, towards the inner part of the annular compartment 25, with an element 31 made of self-lubricating, anti-wear material, such as PTFE with added bronze, which is able to contact, during use, a sliding surface 32 of the fixed supporting flange 27.

The elements 31 give the result that the lips 29 and 30 are not subject to wear due to friction and particles of contaminating material, such as scale or otherwise, so that they prolong the working life of the lips and the seal 10 in its entirety.

The distance D between the radial appendices 22 and 23 is such as to allow, during use, the total axial displacement of the rolling roll 12, without the radial appendices 22 and 23 coming into contact with the tooth 26 of the fixed flange 27, during normal functioning. Thus, for example, with an axial travel C of the rolling roll 12 of 25 mm and a thickness S of the tooth 26 of 7 mm, the distance D is advantageously between 33.1 and 34 mm.

Moreover, the position of the radial appendices 22 and 23, with respect to the annular body 20, is such that, during use, for every axial position of the rolling roll 12, the sealing lips 29 and 30 are always in contact with the sliding surface 32 of the fixed flange 27.

In order to ensure the tension necessary for it to anchor to the tapered end 11 of the rolling roll 12, the seal 10 comprises an annular helical spring 35 and an annular hollow 36 made of steel, both incorporated inside the annular body 20, and a metal ring 37 arranged in the annular compartment 25 in direct contact with the annular body 20.

The annular spring 35 is positioned substantially in correspondence with the center line of the compartment 25 and the metal ring 37, to support the pressure which the latter exerts, during use, on the body 20 and to prevent said body 20, as it is compressed, from bending the radial appendices 22 and 23.

The annular spring 35 has an outer diameter of about 19 mm, that is, greater than that of conventional springs, so that it is suitable to better support the pressure exerted thereon by the metal ring 37 when, during use, the seal 10 is held by the inner shoulder of the bearing 15 and is coupled with the tapered end 11 of the rolling roll 12. Moreover, the greater diameter of the annular spring 35, with the other sizes being the same, reduces the mass of the seal 10 on the side facing the bearing 15: this brings a further advantage, as will be explained better hereafter.

The width of the metal ring 37, in the invention, is a little less than the distance D between the radial appendices 22 and 23, and in this case is about 28 mm. In this way, the forces to which the ring 37 is subjected during use are distributed over a wide area, and the arm B between the axis $Y_1$, passing through the center line of the section of the ring 37, and the centrifugal force $F_{C1}$ is also reduced, the centrifugal force $F_{C1}$ acting on the section of the entire seal 10. We thus obtain a more uniform distribution of forces along the section of the ring 37, a reduction in the maximum force, and the risks of yielding are reduced.

A further advantage due to the width of the ring 37, a little less than D, and the reduction of the mass of the seal 10 on the side facing the bearing 15, is that we reduce the moment M generated by the centrifugal force $F_{C2}$ acting on said mass, with respect to the axis $Y_2$ passing through the edge of the ring 37 facing the radial appendix 23. In fact, the moment M tends to make the radial appendix 23 rotate towards the inside of the annular compartment 25, creating instability, and therefore the smaller the moment M is, the better.

To achieve the seal on the tapered end 11 of the rolling roll 12, the seal 10 comprises, on the side of the bearing 15 (oil seal side), a first lateral lip 39 provided with an annular helical spring 40 and, on the opposite side (water seal side), a second lateral lip 41, with a transverse section substantially shaped like a truncated cone. When at rest, the lateral lips 39 and 41 are slightly inclined towards the inside of the cavity 21, in order to better adhere, during use, to the surface of the tapered end 11.

A reinforcement rib 44 is arranged between the radial appendix 22 and the lateral lip 41.

Moreover, the annular body 20 has a plurality of tiny circular ridges 42 arranged inside the cavity 21, between the lateral lips 39 and 41. In this case, there are six circular ridges 42, three on one side and three on the other side of the annular spring 35. During use, the circular ridges 42 are held constantly against the surface of the tapered end 11 by the metal ring 37.

The seal 10 also comprises a lip 43 inclined towards the bearing 15 and able to divert the oil which, during use, is thrust by centrifugal force towards the outside, that is, from the rolling roll 12 towards the surface 32 of the fixed flange 27. The inclination of the outer surface of the lip 43, with respect to the axis of the central cavity 21 and, during use, with respect to the axis of rotation 13, is constant and very accentuated, in the range of about 60°, in order to facilitate the expulsion of the oil towards the collection zone, situated in the chock of the bearing 15.

The inclined lip 43 is of a length such that it never comes into contact with the brass 47 of the bearing 15, not even when the rolling roll 12 is completely displaced towards the bearing 15 (on the right in FIG. 1).

Moreover, to facilitate the drainage of the oil towards the collection zone, the seal 10 is provided with radial grooves 45 on the side towards the bearing 15.

According to another characteristic feature of the invention, the seal 10 comprises a plurality of radial ribs 46, arranged between the radial appendix 23 and the inclined lip 43. The ribs 46 prevent the tooth 26, especially during the removal of the seal 10, from permanently deforming the radial appendix 23 towards the lip 43.

To assemble the seal 10 on the tapered end 11 of the rolling roll 12, it is advantageous to use a metal disk 50, shaped so as to have a front wall 51, parallel to the front surface 16 of the rolling roll 12, a tapered inner part 52, able to couple with the seal 10 between the radial appendix 22 and the lateral lip 41, and an outer part 53, also tapered, which encourages, during use, the expulsion of the water due to the effect of centrifugal force.

The metal disk 50 is provided with a plurality of buffers 55, made of rubber, with a wide supporting base; these rest during use on the front surface 16 of the rolling roll 12, both to give stability to the disk 50 and also to impart a thrust to the seal 10; this improves the seal between the seal 10 and the tapered end 11 of the rolling roll 12.

It is obvious that additions or modifications can be made to the annular seal as described heretofore without departing from the spirit and scope of the invention.

It is also obvious that, although the invention has been described with reference to a specific example, a person of skill in the art shall certainly be able to achieve many other equivalent forms of seal, all of which shall come within the field and scope of the invention.

What is claimed is:

1. Annular seal for a rolling roll able to be rotatably assembled on at least one supporting oil-film bearing, comprising an annular body made of flexible material, shaped in such a manner as to define a central cavity able to be coupled with a tapered end of said rolling roll, between said supporting bearing and a front surface of said rolling roll, and a pair of substantially parallel radial appendices, which define an outer annular compartment in which, during use, a separation element of a fixed supporting flange is able to be arranged, wherein said annular body, inside said central cavity, is provided with a plurality of circular ridges with the purpose of creating a further barrier to the leakage of the oil on a first side and the entry of the water on a second side, wherein a first annular helical spring and an annular hollow made of steel are incorporated inside said annular body, and a metal ring is arranged in said annular compartment in direct contact with said annular body, wherein said circular ridges are arranged, some on one side and some on the other side with respect to said first annular spring.

2. Seal as in claim 1, wherein said radial appendices have at least terminal seal lips and wherein said terminal lips, at least on the side arranged towards said annular compartment, are provided with anti-wear elements able to contact, during use, a sliding surface of said fixed supporting flange, said anti-wear elements comprising PTFE.

3. Seal as in claim 2, wherein said anti-wear elements are made of self-lubricating material which has a very high resistance to abrasion and a friction coefficient less than that of the material of which said annular body is made.

4. Seal as in claim 2, wherein said anti-wear elements are made of PTFE with added bronze.

5. Seal as in claim 2, wherein said anti-wear elements are made in a single piece with said terminal lips.

6. Seal as in claim 5, wherein said anti-wear elements are vulcanized directly on the material of which said annular body is made.

7. Seal as in claim 2, wherein said anti-wear elements are vulcanized directly on the material of which said annular body is made.

8. Seal as in claim 2, wherein a distance (D) between said radial appendices is such as to allow, during use, the total axial displacement of said rolling roll without said radial appendices entering into contact with said separation element of said fixed supporting flange during normal functioning.

9. Seal as in claim 8, wherein said distance (D) is greater than the sum of the axial travel (C) of said rolling roll with the thickness (S) of said separation element.

10. Seal as in claim 8, wherein the width of said metal ring is a little less than said distance (D) between said radial appendices.

11. Seal as in claim 8, wherein the position of said radial appendices with respect to said annular body is such that, during use, for every axial position of said rolling roll, said terminal lips are always in contact with said sliding surface of said fixed supporting flange.

12. Seal as in claim 8, wherein ends of the terminal sealing lips distalmost to said radial appendices are a distance apart greater than the distance (D) between said radial appendices.

13. Seal as in claim 1, wherein said circular ridges have a height between 1 and 2 mm.

14. Seal as in claim 1, wherein to achieve the seal on the tapered end of said rolling roll, said annular body comprises on the first side of said bearing, an oil seal side, a first lateral lip provided with an annular helical spring and, on the second side, which is opposite to the first side and is a water seal side, a second lateral lip, with a transverse section shaped substantially like a truncated cone, said two lateral lips being slightly inclined, when at rest, towards the inside of said central cavity, in order to better adhere, during use, to the surface of said tapered end.

15. Seal as in claim 14, wherein said circular ridges are disposed between said lateral lips.

16. Seal as in claim 1, wherein each said terminal sealing lip has a taper shape which narrows in a direction away from the radial appendices and each sealing lip is inclined to diverge away from a center line of the seal.

17. Seal as in claim 1, wherein the position of said radial appendices with respect to said annular body is such that, during use, for every axial position of said rolling roll, said terminal lips are always in contact with said sliding surface of said fixed supporting flange.

18. Seal as in claim 1, wherein said first annular helical spring is positioned substantially in correspondence with the center line of said annular compartment and of said metal ring, to support the pressure which said metal ring exerts, during use, on said annular body and to prevent said annular body, as said annular body is compressed, from bending said radial appendices.

19. Seal as in claim 1, wherein said first annular helical spring has an outer diameter of about 19 mm.

20. Seal as in claim 1, wherein said annular body comprises a further lip inclined towards said bearing and able to divert the oil which, during use, is thrust due to the centrifugal force towards the outside, that is, from said rolling roll towards said fixed supporting flange.

21. Seal as in claim 20, wherein the inclination of the outer surface of said further lip with respect to the axis of said central cavity is constant and very accentuated, in the range of about 60°, in order to facilitate the expulsion of the oil towards a collection zone, situated in the chock of said bearing.

22. Seal as in claim 20, wherein said further lip is of a length such that the further lip never enters into contact with any part of said bearing, even when said rolling roll is completely displaced towards said bearing.

23. Seal as in claim 20, wherein said annular body is provided with a plurality of radial ribs, arranged between one of said radial appendices and said further lip.

24. Seal as in claim 23, wherein said radial appendices have at least terminal lips and wherein said terminal lips, at least on the side arranged towards said annular compartment, are provided with anti-wear elements able to contact, during use, a sliding surface of said fixed supporting flange, and said anti-wear elements are made in a single piece with said terminal lips.

25. Seal as in claim 24, wherein said anti-wear elements are vulcanized directly on the material of which said annular body is made.

26. Seal as in claim 24, wherein each said terminal sealing lip has a taper shape which narrows in a direction away from the radial appendices and each sealing lip is inclined to diverge away from a center line of the seal.

27. Seal as in claim 1, wherein said annular body is provided with radial grooves made on the side which, during use, is arranged towards bearing, to facilitate the drainage of the oil towards a collection zone.

28. Seal as in claim 27, wherein said radial appendices have at least terminal lips and wherein said terminal lips, at least on the side arranged towards said annular compartment, are provided with anti-wear elements able to contact, during use, a sliding surface of said fixed supporting flange, and said anti-wear elements are made in a single piece with said terminal lips.

29. Seal as in claim 28, wherein said anti-wear elements are vulcanized directly on the material of which said annular body is made.

30. Seal as in claim 28, wherein each said terminal sealing lip has a taper shape which narrows in a direction away from the radial appendices and each sealing lip is inclined to diverge away from a center line of the seal.

31. Seal as in claim 1, wherein a disk is able to be coupled, during use, with said annular body, said disk comprising a front wall able to be arranged parallel to said front surface of said rolling roll, a tapered inner part, able to laterally contact said annular body, and an outer part, also tapered, able to facilitate, during use, the expulsion of the water due to the effect of the centrifugal force.

32. Seal as in claim 31, wherein said disk is metal and is provided with a plurality of rubber buffers arranged on said front wall, which are able to rest, during use, against said front surface of said rolling roll.

33. Seal as in claim 1, wherein the width of said metal ring is a little less than a distance (D) between said radial appendices.

34. Annular seal for a rolling roll able to be rotatably assembled on at least one supporting oil-film bearing, comprising an annular body made of flexible material, shared in such a manner as to define a central cavity able to be coupled with a tapered end of said rolling roll, between said supporting bearing and a front surface of said rolling roll, and a pair of substantially parallel radial appendices, which define an outer annular compartment in which, during use, a separation element of a fixed supporting flange is able to be arranged, wherein said annular body, inside said central cavity, is provided with a plurality of circular ridges with the purpose of creating a further barrier to the leakage of the oil on a first side and the entry of the water on a second side, wherein said annular body is provided with radial grooves made on the side which, during use, is arranged towards said bearing, to facilitate the drainage of the oil towards a collection zone, wherein a first annular helical spring and an annular hollow made of steel are incorporated inside said annular body, and a metal ring is arranged in said annular compartment in direct contact with said annular body.

* * * * *